United States Patent
Wang et al.

(10) Patent No.: US 9,998,609 B2
(45) Date of Patent: Jun. 12, 2018

(54) SYSTEM AND METHOD FOR DETECTING AND ALERTING RISKS OF INPUTTING INCORRECT ACCOUNT INFORMATION IN REFILL TRANSACTIONS

(71) Applicant: ALIBABA GROUP HOLDING LIMITED, George Town, Grand Cayman (KY)

(72) Inventors: Lei Wang, Hangzhou (CN); Zhiquan Bao, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days. days.

(21) Appl. No.: 15/701,230

(22) Filed: Sep. 11, 2017

(65) Prior Publication Data
US 2017/0374204 A1    Dec. 28, 2017

Related U.S. Application Data

(63) Continuation of application No. 14/812,806, filed on Jul. 29, 2015, now Pat. No. 9,762,747.

(30) Foreign Application Priority Data

Aug. 1, 2014    (CN) .......................... 2014 1 0377859

(51) Int. Cl.
  *H04M 11/00*  (2006.01)
  *H04M 17/00*  (2006.01)
  (Continued)

(52) U.S. Cl.
  CPC ............ *H04M 17/10* (2013.01); *G06Q 20/28* (2013.01); *G06Q 20/349* (2013.01);
  (Continued)

(58) Field of Classification Search
  None
  See application file for complete search history.

(56) References Cited

U.S. PATENT DOCUMENTS

6,668,055 B2    12/2003    Marwell et al.
7,395,319 B2    7/2008    Harris et al.
(Continued)

FOREIGN PATENT DOCUMENTS

CN      201355494 Y      12/2009
WO     WO 2013/048566 A1    4/2013

OTHER PUBLICATIONS

PCT International Search Report and Written Opinion dated Oct. 23, 2015, issued in corresponding International Application No. PCT/US2015/042704 (12 pages).
(Continued)

*Primary Examiner* — Idowu O Osifade
(74) *Attorney, Agent, or Firm* — Finnegan, Henderson, Farabow, Garrett & Dunner LLP

(57) ABSTRACT

Apparatus and method are disclosed for detecting a risk in a refill transaction. The method may include receiving, from a user, a request for refilling an account, the request including account information associated with the account. The method may also include acquiring a contact information set corresponding to the user. The method may further include determining whether the contact information set includes the account information by searching in the contact information set for information matching the account information. In addition, the method may include providing a risk alert to the user if it is determined that the contact information set does not include the account information.

15 Claims, 10 Drawing Sheets

(51) Int. Cl.
*H04W 4/24* (2018.01)
*G06Q 20/40* (2012.01)
*G06Q 20/34* (2012.01)
*G06Q 20/28* (2012.01)

(52) U.S. Cl.
CPC .......... *G06Q 20/4016* (2013.01); *H04W 4/24* (2013.01); *H04M 2017/26* (2013.01)

(56) References Cited

U.S. PATENT DOCUMENTS

| | | |
|---|---|---|
| 7,660,772 B2 | 2/2010 | Verkama |
| 8,774,781 B1 | 7/2014 | Speiser et al. |
| 2002/0026416 A1 | 2/2002 | Provinse |
| 2002/0099618 A1 | 7/2002 | Stiberman |
| 2003/0009439 A1 | 1/2003 | Lee |
| 2003/0050043 A1 | 3/2003 | Ohrstrom et al. |
| 2003/0110129 A1 | 6/2003 | Frazier et al. |
| 2004/0078332 A1 | 4/2004 | Ferguson et al. |
| 2004/0248554 A1 | 12/2004 | Khan et al. |
| 2005/0010484 A1 | 1/2005 | Bohannon et al. |
| 2008/0162497 A1 | 7/2008 | Lim |
| 2009/0134181 A1 | 5/2009 | Wachman et al. |
| 2010/0082674 A1 | 4/2010 | Yiu et al. |
| 2010/0125599 A1 | 5/2010 | Cheng et al. |
| 2011/0246512 A1 | 10/2011 | Lubarski et al. |
| 2013/0041811 A1 | 2/2013 | Vazquez et al. |
| 2013/0218757 A1 | 8/2013 | Ramanathan et al. |
| 2014/0089195 A1 | 3/2014 | Ward et al. |
| 2014/0226805 A1 | 8/2014 | Li |

OTHER PUBLICATIONS

Communication from the European Patent Office enclosing the Extended European Search Report including, pursuant to Rule 62 EPC, the supplementary European Search Report (Art. 153(7) EPC) and the European search opinion dated May 4, 2017, 7 pages.

SYSTEM AND METHOD FOR DETECTING AND ALERTING RISKS OF INPUTTING INCORRECT ACCOUNT INFORMATION IN REFILL TRANSACTIONS

CROSS REFERENCE TO RELATED APPLICATION

This application is a continuation of Ser. No. 14/812,806 filed Jul. 29, 2015, which is based upon and claims priority to Chinese Application No. 201410377859.4, filed Aug. 1, 2014, both of which are incorporated herein by reference in their entirities.

TECHNICAL FIELD

The present application relates to terminal devices, and more particularly, to apparatus and method for detecting and alerting risks in refill transactions.

BACKGROUND

Refilling service fee to a prepaid cell phone service is a common practice. A user can refill or prepay a certain amount of money for his/her cell phone beforehand, and the service provider can deduct an actual service charge directly from the prepaid amount. In this way, the user does not need to visit the service provider's store to pay a bill.

Similar refill activities have been used in more and more scenarios, such as refill of virtual currency/game currency, refill of online game time, and refill of smart electricity cards over the Internet. Usually, each refill account has a unique account number, and the refill procedure is to associate the refill amount with a corresponding account number, thereby providing a prepaid credit for future debits.

The account number of the refill account is generally formed by a plurality of numbers, letters, etc. As a result, when the user inputs the account number manually, it is easy to make mistakes. If the user does not check the input account number carefully, it may cause refilling of an incorrect account number, thereby resulting in financial loss.

SUMMARY

In one aspect, the present disclosure is directed to a method for detecting a risk in a refill transaction. The method may include receiving, from a user, a request for refilling an account, the request including account information associated with the account. The method may also include acquiring a contact information set corresponding to the user. The method may further include determining, by the processor device, whether the contact information set includes the account information by searching in the contact information set for information matching the account information. In addition, the method may include providing a risk alert to the user if it is determined that the contact information set does not include the account information.

In another aspect, the present disclosure is directed to an apparatus. The apparatus may include a memory device and a processor device communicatively coupled to the memory device. The processor device may be configured to receive, from a user, a request for refilling an account, the request including account information associated with the account. The processor device may also be configured to acquire a contact information set corresponding to the user. The processor device may further be configured to determine whether the contact information set includes the account information by searching in the contact information set for information matching the account information. In addition, the processor device may be configured to provide a risk alert to the user if it is determined that the contact information set does not include the account information.

In a further aspect, the present disclosure is directed to a non-transitory, computer-readable medium storing instructions that, when executed by a processor device, cause the processor device to perform a method for detecting a risk in a refill transaction. The method may include receiving, from a user, a request for refilling an account, the request including account information associated with the account. The method may also include acquiring a contact information set corresponding to the user. The method may further include determining, by the processor device, whether the contact information set includes the account information by searching in the contact information set for information matching the account information. In addition, the method may include providing a risk alert to the user if it is determined that the contact information set does not include the account information.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

Embodiments of the present application may detect risks in refill transactions and provide alerts to a user performing the refill operation. For example, some embodiments may verify a refill account number and determine the identity of the refill account number or a relationship between the user performing the refill action and the refill account number to prevent errors caused by an incorrect input and to avoid financial loss of the user.

Figure 1:
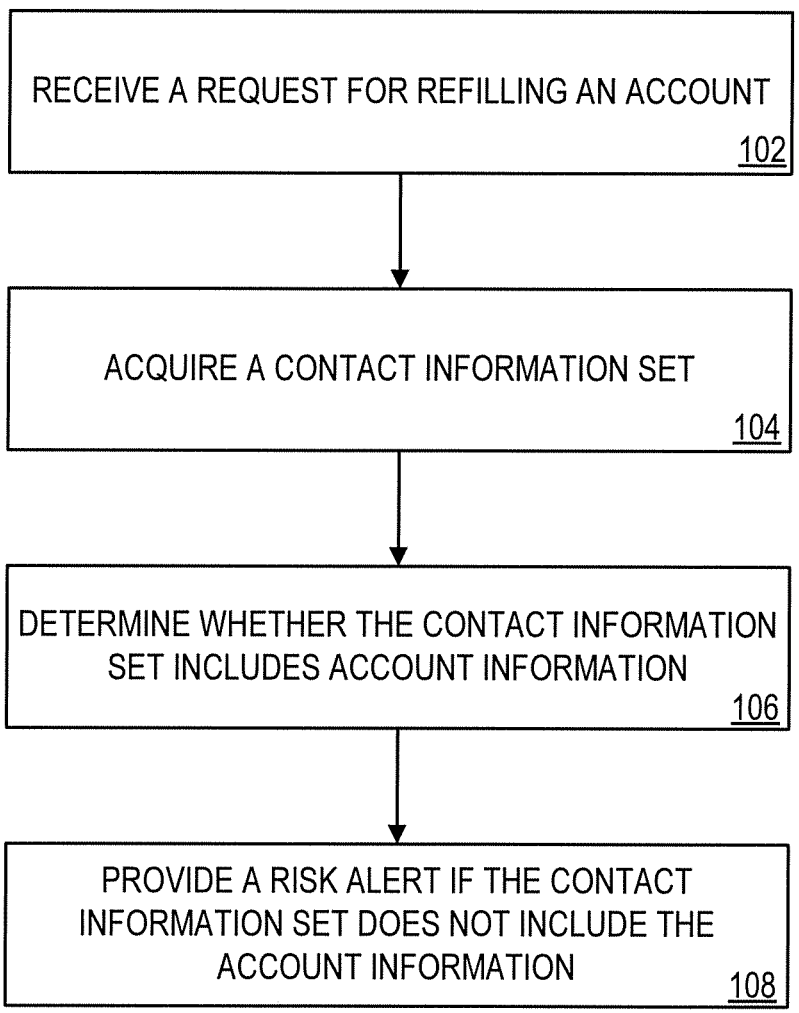
FIG. 1 is a flow chart of an exemplary method for detecting refill transaction risks, according to an embodiment of the present application.

FIG. 1 is a flow chart of an exemplary method 100 for detecting refill transaction risks.

As shown in FIG. 1, method 100 includes several steps. One or more steps may be optional.

In Step 102, a request for refilling an account may be received from a user performing the refill operation. The request may carry account information associated with the account, such as a refill account number.

In this embodiment, the user can perform a refill operation using any electronic device that can be connected to the Internet. For example, mobile devices such as cell phones, tablet computers, notebook computers, desktop computers, smart TVs, or any other suitable electronic devices. When performing the refill operation, the user may designate a specific refill account by inputting a refill account number. For example, when refilling a prepaid cell phone account, the refill account number may be a cell phone number. In another example, when refilling a virtual currency account, the refill account number may be a user name or a user account number of a corresponding virtual currency platform. In another example, when refilling an online game playtime, the refill account number may be a game account number.

In Step 104, a contact information set corresponding to the user may be acquired.

In this embodiment, by including multiple contact information sources, information in the contact information set may be used to cover a broad range of contacts of the user. Several exemplary contact information sources are described as follows. Other suitable sources may also be used.

For example, when the user performs a refill operation using a cell phone account, one contact information source may be an electronic address book stored locally in the cell phone. Therefore, the contact information set may include contact information corresponding to the user obtained from the electronic address book. The user may also use other electronic devices such as a tablet computer to refill a cell phone account. In some embodiments, contact information created by the user and stored in the electronic address book of the cell phone can be obtained using a synchronizing function to synchronize the electronic address book to other electronic device. For example, an electronic device, such as a table computer, may send an acquisition request to a server storing the electronic address book and receive the contact information corresponding to the user returned by the server.

The contact information in the electronic address book may be created by the user manually, and may be associated with the user's family, friends, or relatives. In other words, these contacts are likely known by the user. When the refill account number input by the user matches information of a certain contact in the electronic address book, the possibility that the user makes mistakes in inputting the account number is relatively low.

As another example, the contact information source may be a refill platform corresponding to a refill webpage, such as "Alipay" or "Taobao." The user may register an account in the refill platform, and may use the account to log into the refill platform and then perform specific refill operations. In this case, the contact information set may include contact information corresponding to the login account of the user in the refill platform.

Besides the electronic address book and the refill platform, many other third-party applications may also have their own contact information systems. Therefore, contact information in the third-party applications can also be obtained for verifying the refill account number input by the user. However, it is noted that some third-party applications may have data security problems, especially for applications in refill platform. Therefore, data from third-party applications may not be reliable and may cause security risks.

In Step 106, a determination may be made by, for example, a processor device, to determine whether the contact information set includes the account information, e.g., the refill account number input by the user. The processor device may search in the contact information set for information matching the account information input by the user.

In some embodiments, multiple contact information sources can be combined. For example, electronic address book may be combined with refill platform. In this case, the contact information set may include first contact information corresponding to the user obtained from the electronic address book and second contact information corresponding to the login account of the user used in the refill platform. In this case, the searching for the refill account number in the contact information set can be divided into two stages.

In the first stage, the processor device may determine whether the first contact information (contact information corresponding to the user obtained from the electronic address book) includes the account information input by the user. For example, the processor device may search in the first contact information for information matching the account information inputted by the user. If the first contact information does not include the account information, the process may enter the second stage, in which the processor device may determine whether the second contact information (contact information corresponding to the login account of the user used in the refill platform) includes the account information input by the user. For example, the processor device may search in the second contact information for information matching the account information inputted by the user. In some embodiments, the second contact information may be acquired before the first stage. In other embodiments, the second contact information may be acquired upon the completion of the first stage and as supplemental information. Dividing the searching process into two stages may reduce the data quantity of the contact information during each of the searching stages.

The contact information sources, e.g., electronic address book, refill platform, and/or third-party applications may be used to obtain the contact information, and multiple data acquisition modes may be employed. For example, contact information corresponding to the user may be stored locally and/or on a server. When the contact information is stored locally, the processor device may retrieve the contract information by accessing the local data storage or memory. When the contact information is stored on a server, the processor device may send an acquisition request to the server and receive the contact information returned by the server.

In Step 108, a risk alert may be provided to the user, e.g., through an interface, if the contact information set does not include the account information input by the user. For example, if the searching operation does not yield any matching contact in the contact information set, it is likely that the account information input by the user contains errors, such as one or more wrong numbers or misspells due to fat fingers.

By matching a refill account number input by the user with contact information in the contact information set, the processor device may check if the refill account number has any relationship with the user. If the refill account number belongs to a stranger that has no apparent relationships with the user, such refill account number may be mistakenly input by the user. In this case, the processor device may issue a risk alert to notify the user to double check if any inputting mistake occurs, thereby avoiding financial loss to the user.

Figure 2:
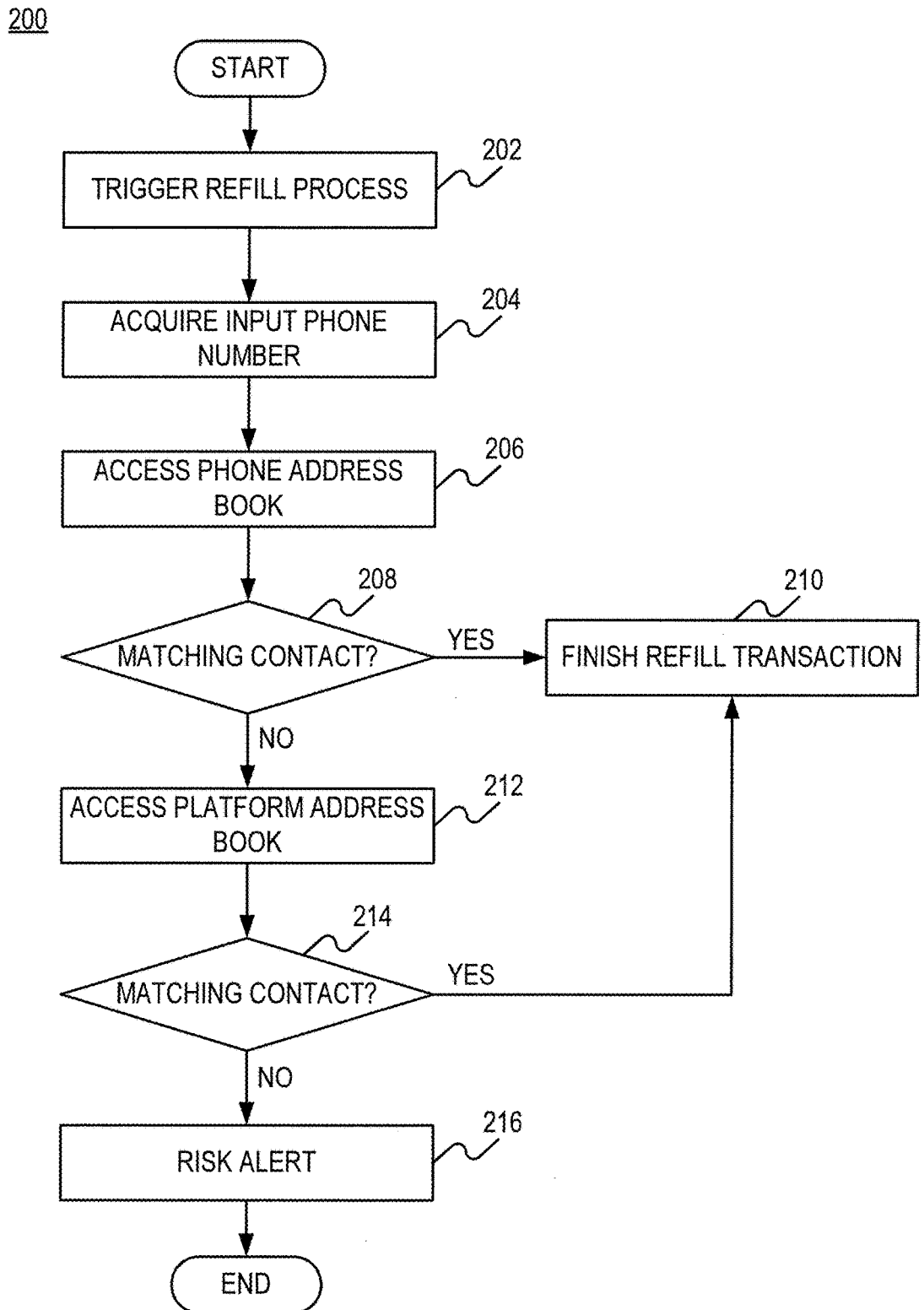
FIG. 2 is a flow chart of an exemplary method for detecting refill transaction risks, according to another embodiment of the present application.
Figure 3A:
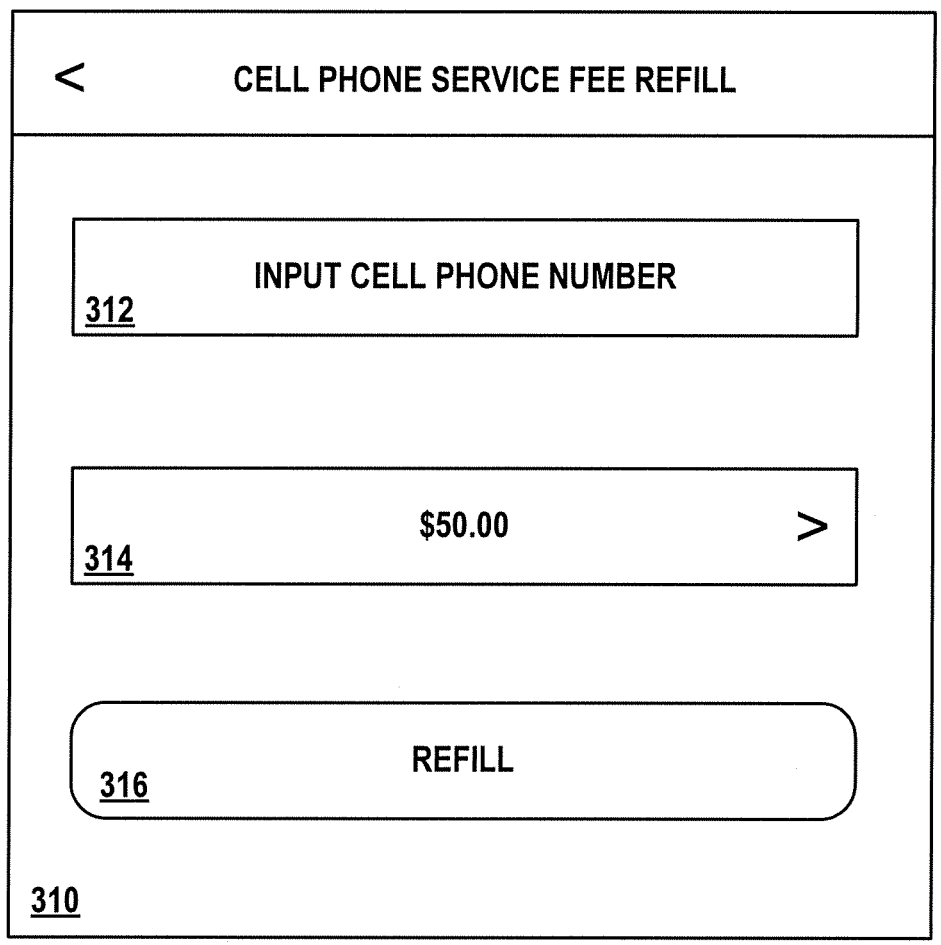
FIGS. 3A-3D are schematic diagrams of exemplary interfaces, according to embodiments of the present application.

FIG. 2 is a flow chart of an exemplary method 200 for detecting refill transaction risks. Method 200 start from step 202, in which a refill process is triggered by a user, referred to hereafter as User A. For example, User A may use a certain refill application M on a cell phone to refill a cell phone account of another user, referred to hereafter as User B. Once a cell phone service fee refill function of the refill application M is triggered by User A, the cell phone may display an interface 310 shown in FIG. 3A, to prompt User A to input a phone number of User B in an input block 312. User A may also choose or input a specific refilling amount, such as $50.00 shown in block 314.

In Step 204, a cell phone number input by User A may be acquired. For example, referring to FIG. 3B, the cell phone number "202 456 7890" input into block 312 may be acquired by the processor device.

In Step 206, the processor device may access the electronic address book corresponding to User A. The electronic address book may be stored in the cell phone used by User A to perform the refill operation, e.g., in a memory card of the cell phone, or in a Subscriber Identity Module (SIM) card. Alternatively or additionally, the electronic address book may be stored on a server. In this case, User A's account information (e.g., User A's ID number, cell phone number, etc.) may be used to log into the server, for acquiring and/or synchronizing the content of the electronic address book from the server. The acquisition and/or synchronization may be performed periodically or in real time.

In Step 208, the content of the electronic address book, e.g., the contact information corresponding to User A, is used to search for information matching the cell phone number input by User A. If contact information matching the cell phone number input by User A is found, the process proceeds to Step 210; otherwise, the process proceeds to Step 212.

Figure 3B:
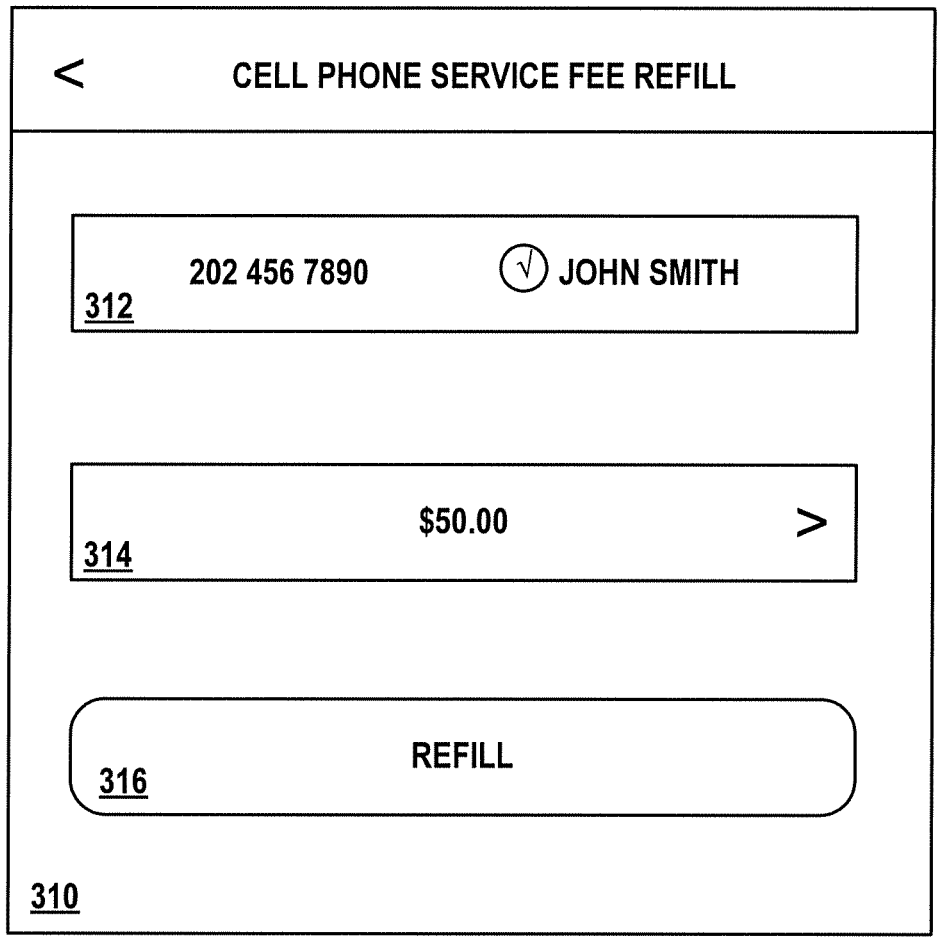

If contact information matching the cell phone number input by User A is found in the electronic address book, the interface shown in FIG. 3B may be displayed. As shown in FIG. 3B, an icon such as "√" can be used to indicate that the cell phone number input by User A is found in the electronic address book. In addition, the corresponding contact information, e.g., the name of the contact—John Smith, may be shown to allow User A to confirm whether the input cell phone number belongs to User B.

In Step 210, the refill transaction is complete. For example, User A may press button 316 shown in FIG. 3B to finish the refill transaction.

In Step 212, the processor device may access the electronic address book corresponding to User A saved on the refill platform. For example, the processor device may retrieve contact information of User A in refill application M when application M is associated with the refill platform. In some embodiments, the locally stored electronic address book may be different from the electronic address book retrieve in refill application M. Thus, the contact information respectively retrieved in Step 206 and Step 212 may be different but may also contain overlapping content.

In Step 214, the contact information retrieved in refill application M may be used to search for information matching the cell phone number input by User A. If contact information matching the cell phone number input by User A is found, the process proceeds to Step 210; otherwise, the process proceeds to Step 216.

In some embodiments, when the contact information matching the cell phone number input by User A is found in the electronic address book retrieved in refill application M, the interface shown in FIG. 3B may be displayed, indicating that the input cell phone number is likely correct.

Figure 3C:
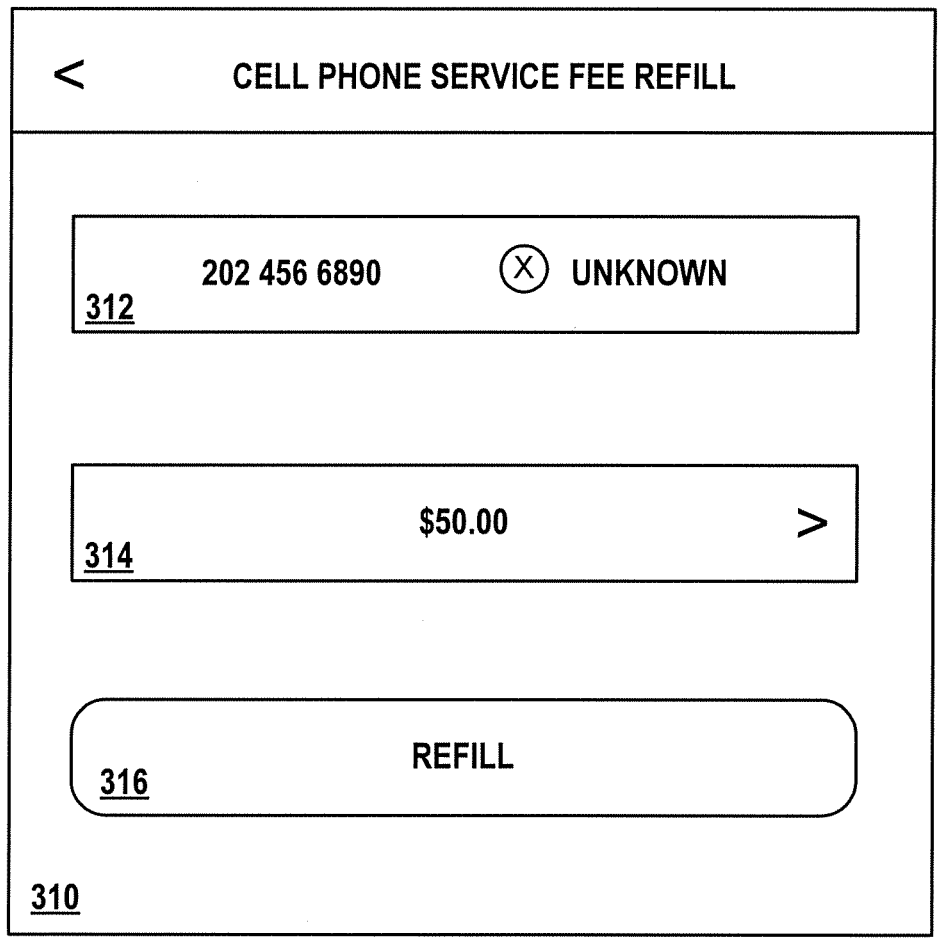
Figure 3D:
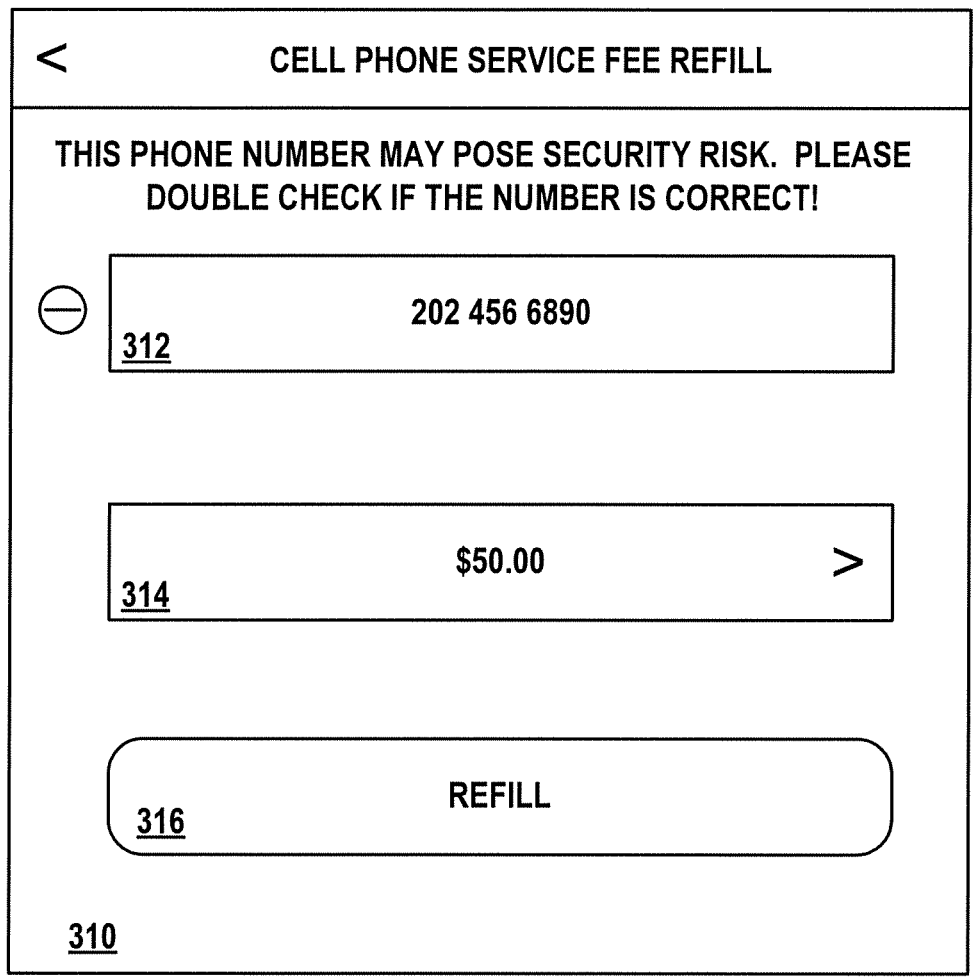

In Step 216, the processor may issue a risk alert. In some embodiments, the interface shown in FIG. 3C may be displayed, in which alert indicators such as "×", "Unknown", or "Not Found" may be used to indicate that the cell phone number input by User A is not found, and User A may risk refilling to a incorrect account. The risk alert may be used to notify User A to double-check the input phone number. In another example, interface shown in FIG. 3D may be displayed. In FIG. 3D, an alert message may be displayed. Alternatively or additionally, an alert icon such as "Θ" may be displayed to notify User A that the input telephone number may be incorrect.

In the above description, cell phone number is used as an example to disclose embodiments of the present application. The disclosed method and system are also applicable to other types of account information, such as cable services, utility services, Internet services, online gaming, etc.

Figure 4:
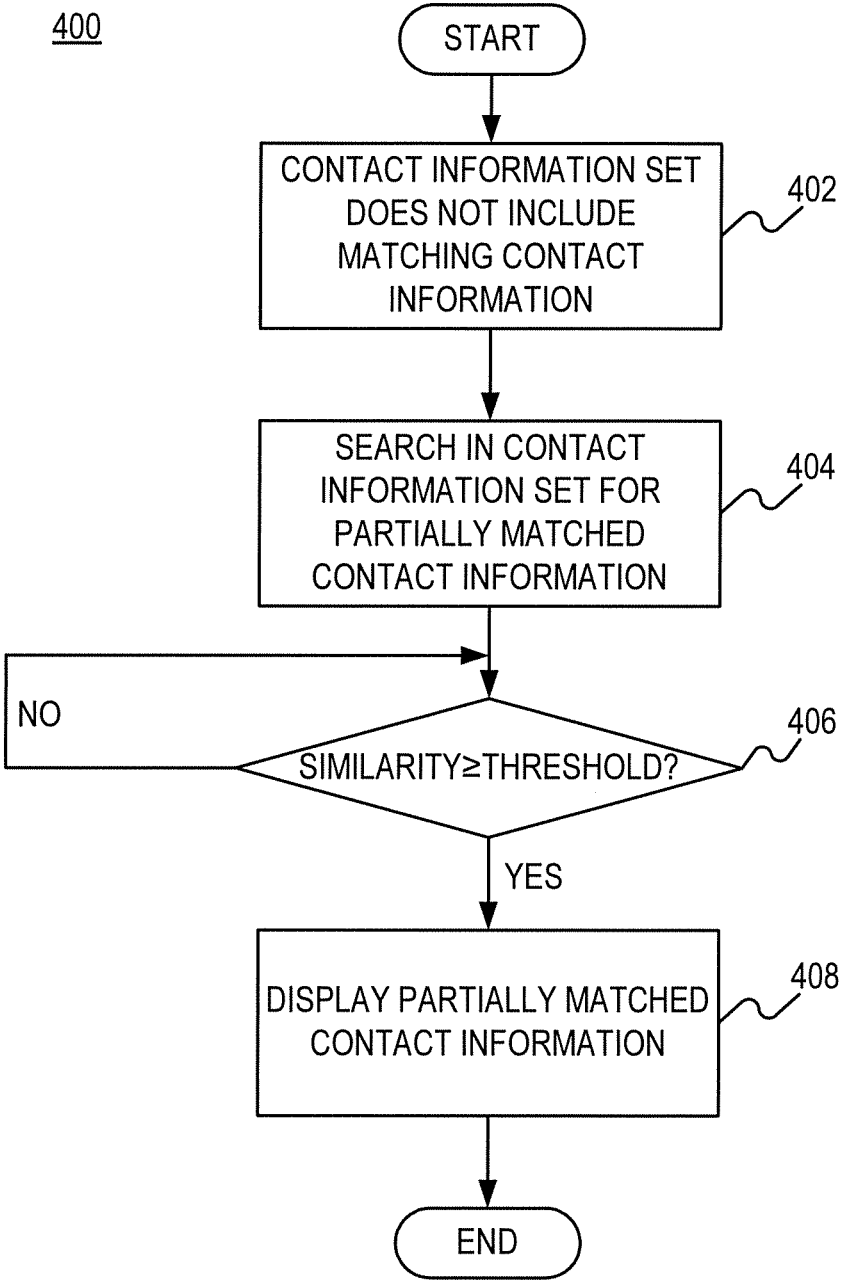
FIG. 4 is a flow chart of another exemplary method for detecting refill transaction risks, according to an embodiment of the present application.

In some embodiments, since User A likely knows the cell phone number of User B, the input telephone number, even containing errors, may only be off a few digits. That is, the input number may be partially correct and partially incorrect. In view of this, the present application further provides another exemplary risk alerting method 400 shown in FIG. 4.

Method 400 may be carried out following the NO branch of Step 214 in FIG. 2. In Step 402, after the two stage searching operations in FIG. 2, it may be determined that the contact information set does not include matching contact information because no contact matching the refill account number input by User A can be found. For example, assume that the refill account number input by User A is a telephone number "202 456 6890," as shown in FIG. 3C.

In Step 404, a searching operation is performed in the contact information set corresponding to User A by, for example, using the refill account number (e.g., the cell phone number 202 456 6890) as a key word to search for a cell phone number partially matching "202 456 6890."

In Step 406, based on searching results, if one or more partially matched telephone numbers are found (e.g., at least a predetermined number of digits match the input telephone number), a similarity of each matching result with respect to the input telephone number is determined. For example, the similarity may be quantified by the number of digits that match the input telephone number. If a certain matching result has a similarity higher than or equal to a preset similarity threshold (Step 406), the process may proceed to Step 408; otherwise, the process may make further determination, until all partially matched results are traversed.

Figure 5:
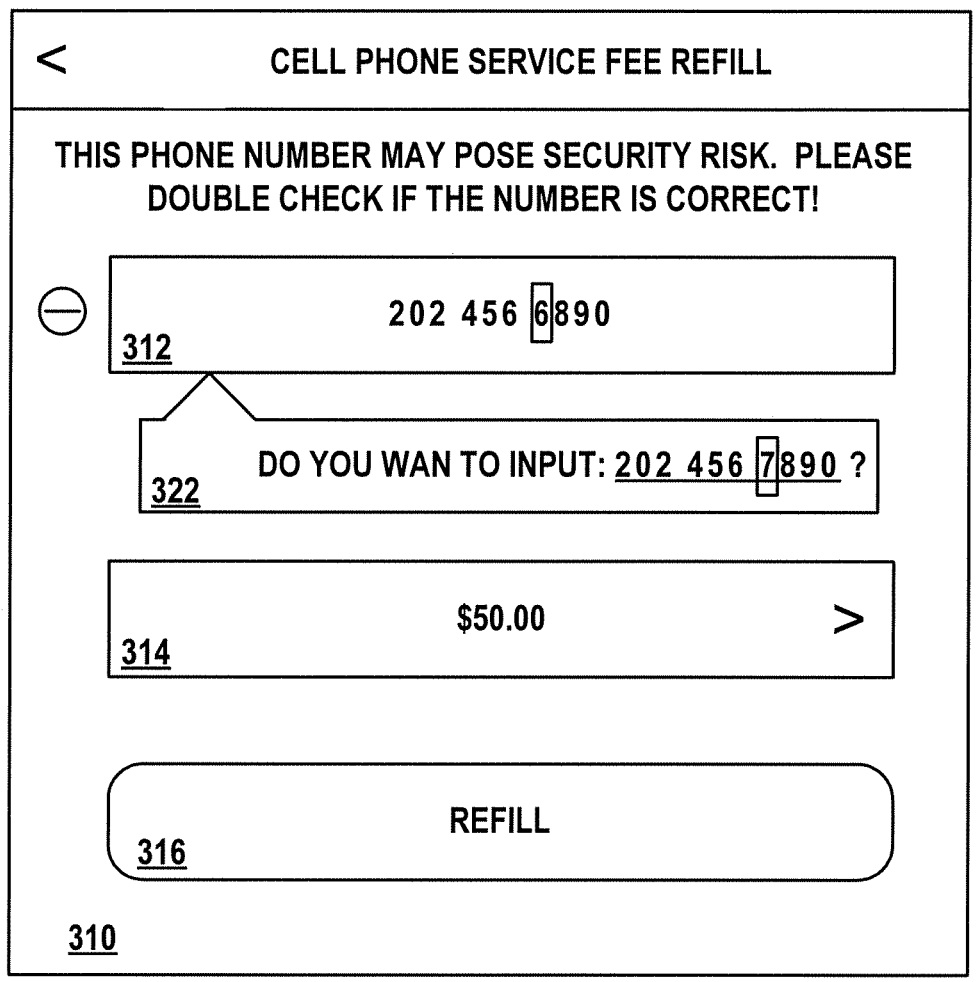
FIG. 5 is a schematic diagram of another exemplary interface, according to an embodiment of the present application.

In Step 408, the partially matched result may be displayed to the user through an interface, such as interface 320 shown in FIG. 5.

In some embodiments, the preset similarity threshold may be set by a developer beforehand, or may be edited and adjusted by the user during the usage stage. As shown in FIG. 5, interface 320 may also display an alert message 322, suggesting that there may be an error in the input telephone number and the suggested correct number.

In some embodiments, the processor device may compare the input telephone number and the partially matched result (e.g., the suggested correct number) and determine a matched portion and a non-matched portion. For example, in the example shown in FIG. 5, the non-matched portion is the seventh digit, and matched portion includes all other digits. The matched portion and the non-matched portion may also be displayed in different manners. For example, while the matched portion may be displayed in a regular fashion, the non-matched portion, indicating the difference between the input telephone number and the suggested correct number, may be displayed in an emphasized manner. For example, in FIG. 5, a block is added to the seventh digit in both the input telephone number and the suggested correct number. A person skilled in the art can understand that the matched portion and the non-matched portion may also be displayed in other ways, for example, by using different colors or by highlighting, which are all applicable to the technical solutions of the present application.

Figure 6:
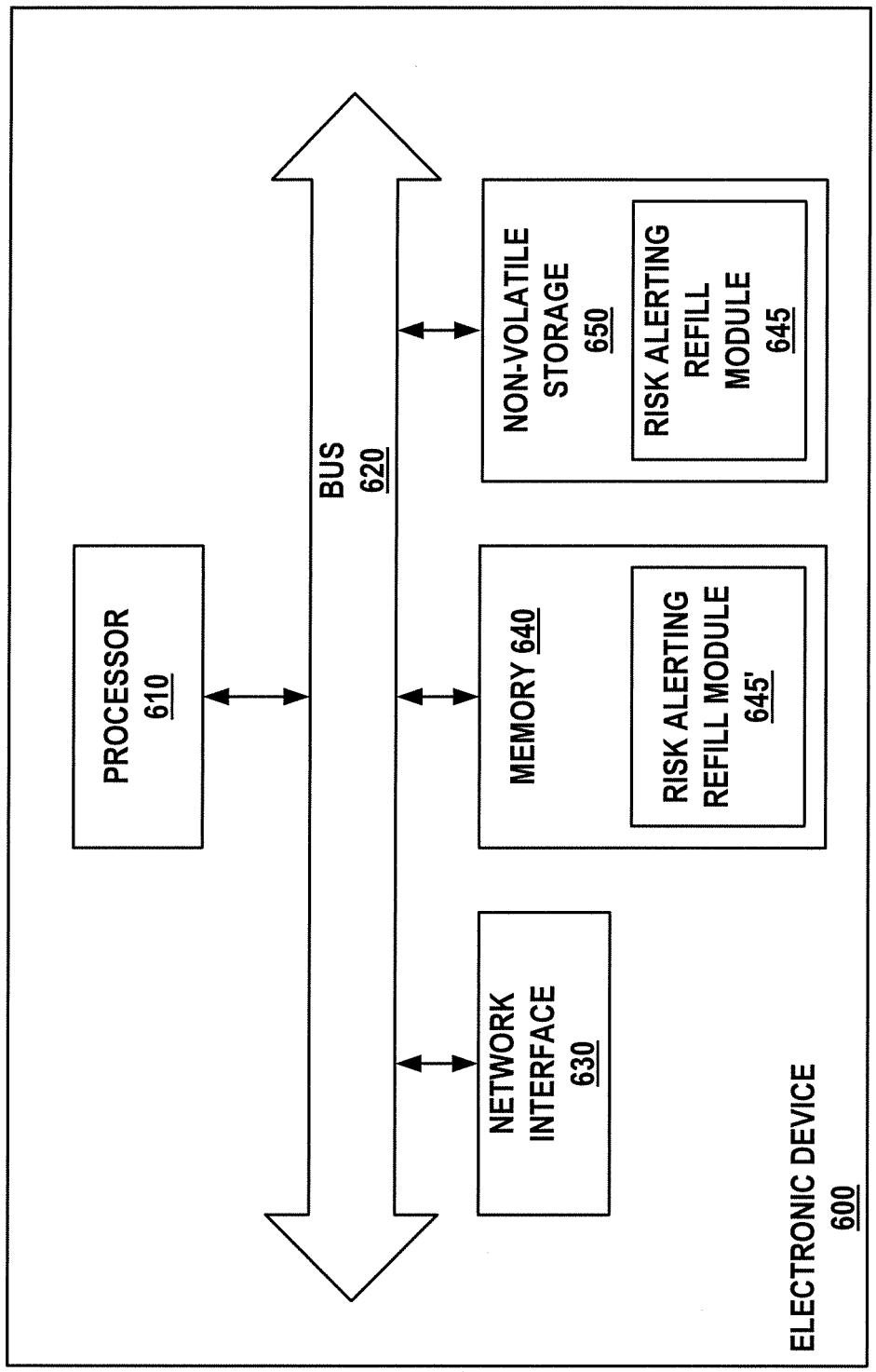
FIG. 6 is a block diagram of an exemplary electronic device, according to an embodiment of the present application.

FIG. 6 is a block diagram of an exemplary electronic device 600 for implementing the above-disclosed technical solutions. Referring to FIG. 6, electronic device 600 may include a processor device 610, a bus 620, a network interface 630, a memory device 640, and a non-volatile storage 650. Processor device 610 may execute instructions of a computer software program stored in non-volatile storage 650 and loaded in memory device 640 to perform various functions of the risk alert methods disclosed above. The software program may be functionally recognized as a risk alerting refill module 645 stored in non-volatile storage 650 or 645' when loaded into memory device 640. In some embodiments, risk alerting refill module 645 may be part of an application system that provides services to users. Other forms of implementations of the above-disclosed functions such as using logic devices or combined software and hardware, are also contemplated by this disclosure.

Figure 7:
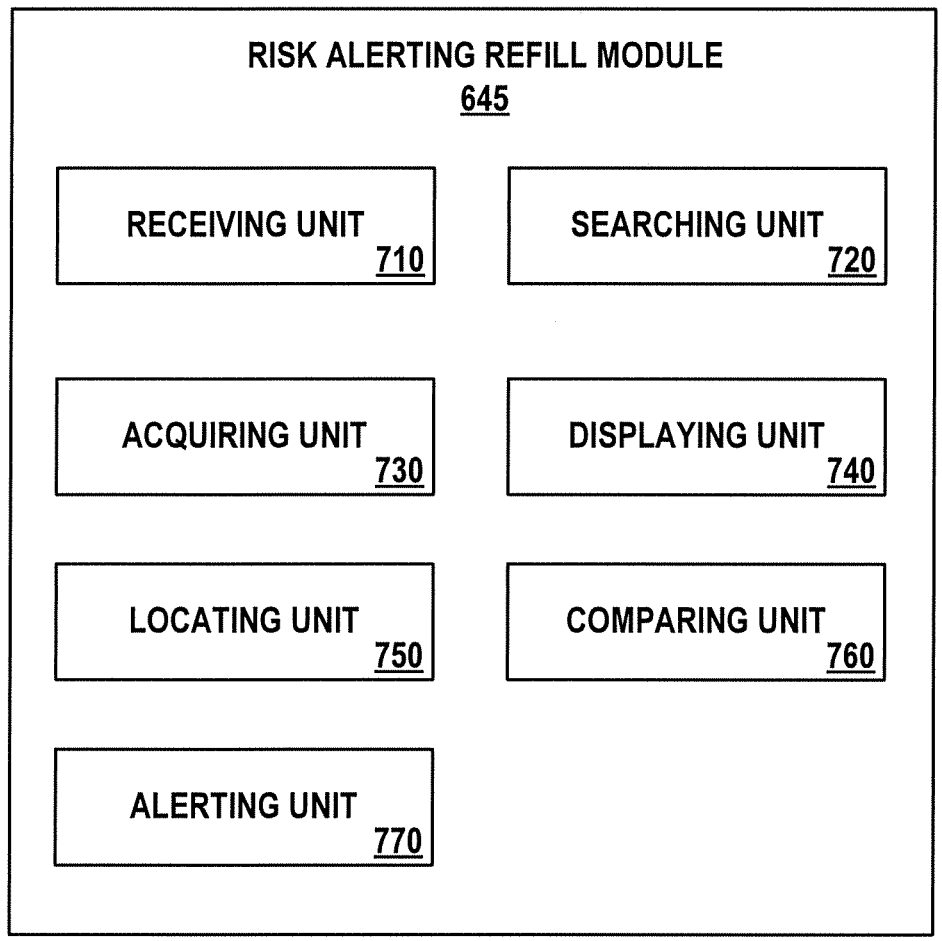
FIG. 7 is a functional block diagram of an exemplary risk alerting refill module, according to an exemplary embodiment of the present application.

FIG. 7 is a functional block diagram of an exemplary implementation of risk alerting refill module 645. Referring to FIG. 7, risk alerting refill module 645 may include a receiving unit 710, a searching unit 720, an acquiring unit 730, a display unit 740, a locating unit 750, a comparing unit 760, and an alerting unit 770.

Receiving unit 710 may be configured to receive, from a user, a request for refilling an account. The request may include account information associated with the account.

Acquiring unit 730 may be configured to acquire a contact information set corresponding to the current user.

Searching unit 720 may be configured to search in the contact information set for information matching the account information.

Alerting unit 770 may be configured to provide a risk alert to the user.

Displaying unit 740 may be configured to display an interface, a risk alert, partially matched result, and other information to the user.

Locating unit 750 may be configured to locate and retrieve contact information.

Comparing unit 760 may be configured to compare a partially matched result with account information input by the user.

Processor device 610 may include one or more central processing units (CPUs). Electronic device 600 may include an input/output interface (I/O interface).

Memory device 640 may include a volatile memory, a Random Access Memory (RAM), and/or a non-volatile memory (NVM) such as a Read Only Memory (ROM) or a flash memory.

The specification has described apparatuses and methods for detecting risks in refill transactions. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being perforated in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, implemented by a processor device, for detecting a risk in a refill transaction, comprising:
   receiving, from a user, a request for refilling an account, the request including account information associated with the account;
   acquiring a contact information set corresponding to the user;
   determining, by the processor device, whether the contact information set includes the account information and displaying, responsive to the determination that the contact information set does not include the account information and the contact information set includes information partially matching the account information, a matched portion and a non-matched portion of the partially matched contact information in different manners, wherein the non-matched portion corresponds to a portion of the partially matched contact information that is different from a corresponding portion of the account information and wherein the matched portion corresponds to a portion of the partially matched contact information that is the same as a corresponding portion of the account information.

2. The method of claim 1, wherein the contact information set includes contact information corresponding to the user obtained from an electronic address book.

3. The method of claim 1, wherein the contact information set includes contact information corresponding to a login account of the user used in a refill platform.

4. The method of claim 1,
wherein the contact information set includes:
   first contact information corresponding to the user obtained from an electronic address book; and
   second contact information corresponding to a login account of the user used in a refill platform; and
wherein the method comprises:
   determining whether the first contact information includes the account information by searching in the first contact information for information matching the account information; and
   determining, responsive to a determination that the first contact information does not include the account information, whether the second contact information includes the account information by searching in the second contact information for information matching the account information.

5. The method of claim 1, wherein the contact information set includes contact information corresponding to the user and wherein the method includes:
   retrieving the contact information corresponding to the user stored locally.

6. The method of claim 1, wherein the contact information set includes contact information corresponding to the user and the method includes:
   sending an acquisition request to a server; and
   receiving the contact information corresponding to the user returned by the server.

7. An apparatus, comprising:
a memory device configured to store a set of instructions; and
a processor device communicatively coupled to the memory device, wherein the processor device is configured to execute the set of instructions to cause the apparatus to:
   receive, from a user, a request for refilling an account, the request including account information associated with the account;
   acquire a contact information set corresponding to the user;
   determine whether the contact information set includes the account information;
and
   display, in response to the determination that the contact information set does not include the account information and the contact information set includes information partially matching the account information, a matched portion and a non-matched portion of the partially matched contact information in different manners, wherein the non-matched portion corresponds to a portion of the partially matched contact information that is different from a corresponding portion of the account information and wherein the matched portion corresponds to a portion of the partially matched contact information that is the same as a corresponding portion of the account information.

8. The apparatus of claim 7, wherein the contact information set includes contact information corresponding to the user obtained from an electronic address book.

9. The apparatus of claim 7, wherein the contact information set includes contact information corresponding to a login account of the user used in a refill platform.

10. The apparatus of claim 7,
wherein the contact information set includes:
   first contact information corresponding to the user obtained from an electronic address book; and
   second contact information corresponding to a login account of the user used in a refill platform; and
wherein the processor device is configured to:
   determine whether the first contact information includes the account information by searching in the first contact information for information matching the account information; and
   if the first contact information does not include the account information, determine whether the second contact information includes the account information by searching in the second contact information for info! nation matching the account information.

11. The apparatus of claim 7, wherein the contact information set includes contact information corresponding to the user and wherein the processor device is further configured to cause the apparatus to:
   retrieve the contact information corresponding to the user stored locally.

12. The apparatus of claim 7, wherein the contact information set includes contact information corresponding to the user and wherein the processor device is further configured to cause the apparatus to:
   send an acquisition request to a server; and
   receive the contact information corresponding to the user returned by the server.

13. A non-transitory, computer-readable medium storing a set of instructions that is executable by at least one processor of an apparatus to cause the apparatus to perform a method for detecting a risk in a refill transaction, the method comprising:
   receiving, from a user, a request for refilling an account, the request including account information associated with the account;
   acquiring a contact information set corresponding to the user;
   determining, by the processor device, whether the contact information set includes the account information and displaying, responsive to the determination that the contact information set does not include the account information, a matched portion and a non-matched portion of the partially matched contact information in different manners, wherein the non-matched portion corresponds to a portion of the partially matched contact information that is different from a corresponding portion of the account information and wherein the matched portion corresponds to a portion of the partially matched contact information that is the same as a corresponding portion of the account information.

14. The computer-readable medium of claim 13, wherein the contact information set includes at least one of:
  contact information corresponding to the user obtained from an electronic address book; or
  contact information corresponding to a login account of the user used in a refill platform.

15. The computer-readable medium of claim 13,
  wherein the contact information set includes:
    first contact information corresponding to the user obtained from an electronic address book; and
    second contact information corresponding to a login account of the user used in a refill platform; and
  wherein the set of instructions that is executable by the at least one processor of the apparatus to cause the apparatus to further perform:
    determining whether the first contact information includes the account information by searching in the first contact information for information matching the account information; and
    if the first contact information does not include the account information, determining whether the second contact information includes the account information by searching in the second contact information for information matching the account information.

* * * * *

UNITED STATES PATENT AND TRADEMARK OFFICE
CERTIFICATE OF CORRECTION

| | |
|---|---|
| PATENT NO. | : 9,998,609 B2 |
| APPLICATION NO. | : 15/701230 |
| DATED | : June 12, 2018 |
| INVENTOR(S) | : Lei Wang et al. |

It is certified that error appears in the above-identified patent and that said Letters Patent is hereby corrected as shown below:

In the Claims

In Claim 10, Column 10, Line 31, "info! nation" should read --information--.

Signed and Sealed this
Fourteenth Day of August, 2018

Andrei Iancu
*Director of the United States Patent and Trademark Office*